United States Patent
Daniel (10) Patent No.: US 9,202,195 B1
(45) Date of Patent: Dec. 1, 2015

(54) SYSTEM AND METHOD FOR CONFIRMING MAIL DELIVERY USING AN INTERACTIVE ELECTRONIC CARD

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 0 days.

(21) Appl. No.: 14/207,251

(22) Filed: Mar. 12, 2014

Related U.S. Application Data (60) Provisional application No. 61/776,867, filed on Mar. 12, 2013.

(51) Int. Cl.
*G06K 5/00* (2006.01)
*G06Q 10/08* (2012.01)
*G06K 19/077* (2006.01)

(52) U.S. Cl.
CPC ...... *G06Q 10/0833* (2013.01); *G06K 19/07707* (2013.01)

(58) Field of Classification Search
CPC ............ G07F 7/08; G07F 7/086; G07F 7/12; G07F 7/125; G07F 17/16; G07F 17/26; G07F 7/082; G07F 7/1008; G07F 7/1016; G06K 19/14; G06K 19/06037; G06K 19/06046; G06K 19/18; G06K 2019/06253; G06K 7/01
USPC ............... 235/380, 492, 382, 382.5, 383, 375
See application file for complete search history.

(56) References Cited

U.S. PATENT DOCUMENTS

| | | | | |
|---|---|---|---|---|
| 5,841,886 A * | 11/1998 | Rhoads | ......................... | 382/115 |
| 5,907,149 A * | 5/1999 | Marckini | ...................... | 235/487 |
| 6,748,533 B1 * | 6/2004 | Wu et al. | ....................... | 713/176 |
| 8,301,893 B2 * | 10/2012 | Brundage | ..................... | 713/176 |
| 8,408,470 B2 * | 4/2013 | Komatsu et al. | .............. | 235/470 |
| 2004/0181671 A1 * | 9/2004 | Brundage et al. | ............. | 713/176 |
| 2008/0149713 A1 * | 6/2008 | Brundage | ..................... | 235/435 |

* cited by examiner

*Primary Examiner* — Thien M Le
(74) *Attorney, Agent, or Firm* — Carol N. Green Kaul, Esq.

(57) ABSTRACT

The present invention relates generally to an apparatus, system and method using an identification card with a coded frame displayed thereon that includes one or more hot corners with embedded hyperlinks or icons, activated for display when image capturing means scans the coded frame. Upon activation, consumer may access and determine the mail status for a mailed item. In some embodiments, consumer may use the activated hyperlink or icon for controlling media content pursuant to a control command associated with the one icon or hyperlink and for two-way communications with a government agency, e.g. fire and rescue, police department to communicate information to such agencies. Conversely, the government agency may publish information as media content, e.g. public service announcements, to the consumer when the coded frame is scanned and the icons or hyperlinks in any one hot corner are engaged for retrieving corresponding media content.

17 Claims, 9 Drawing Sheets

SYSTEM AND METHOD FOR CONFIRMING MAIL DELIVERY USING AN INTERACTIVE ELECTRONIC CARD

PRIORITY CLAIM

This patent application is a continuation-in-part of, and claims priority under 35 U.S.C. 119(e) to U.S. Provisional Patent Application Ser. No. 61/776,867 titled "System And Method For Confirming Mail Delivery Using An Interactive Electronic Card" filed Mar. 12, 2013. The entire disclosure of the afore-mentioned patent application is incorporated by reference as if fully stated herein.

FIELD OF THE INVENTION

The present invention relates generally to an apparatus, system and method using an identification card with a coded frame displayed thereon that includes one or more hot corners with embedded hyperlinks or icons, activated for display when image capturing means scans the coded frame. Upon activation, consumer may access and determine the mail status for a mailed item. In some embodiments, consumer may use the activated hyperlink or icon for controlling media content pursuant to a control command associated with the one icon or hyperlink and for two-way communications with a government agency, e.g. fire and rescue, police department to communicate information to such agencies. Conversely, the government agency may publish information as media content, e.g. public service announcements, to the consumer when the coded frame is scanned and the icons or hyperlinks in any one hot corner are engaged for retrieving corresponding media content.

BACKGROUND OF THE INVENTION

Oftentimes, mail customers are anxious and worried that the mail deposited with the United States Postal Service ("USPS") is not delivered in a timely manner or worse yet, forever lost. The USPS tries to minimize these occurrences by offering different confirmation delivery mailing options at a premium price whereby consumers can track the delivery online. However, not everyone takes advantage of that option, and when they don't, anxiety about the actual delivery can rue the day. As a result consumers become vulnerable to fear and fall prey to identity theft schemes with phishing emails that appear to be directed from the USPS requiring confirmation of confidential identity information and/or on occasion credit identification information. Thus, there needs to be a system and method of providing tracking of the mail as it goes through the mailing system in a manner that is secure without compromising the consumer's confidential information. The system and methods described herein satisfies these long felt needs in a new and novel manner that the prior art has been unable to resolve. For a further and more fully detailed understanding of the present invention, various objects and advantages thereof, reference is made to the following detailed description and the accompanying drawings.

Additional objectives of the present invention will appear as the description proceeds. The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatus

Figure 1A:
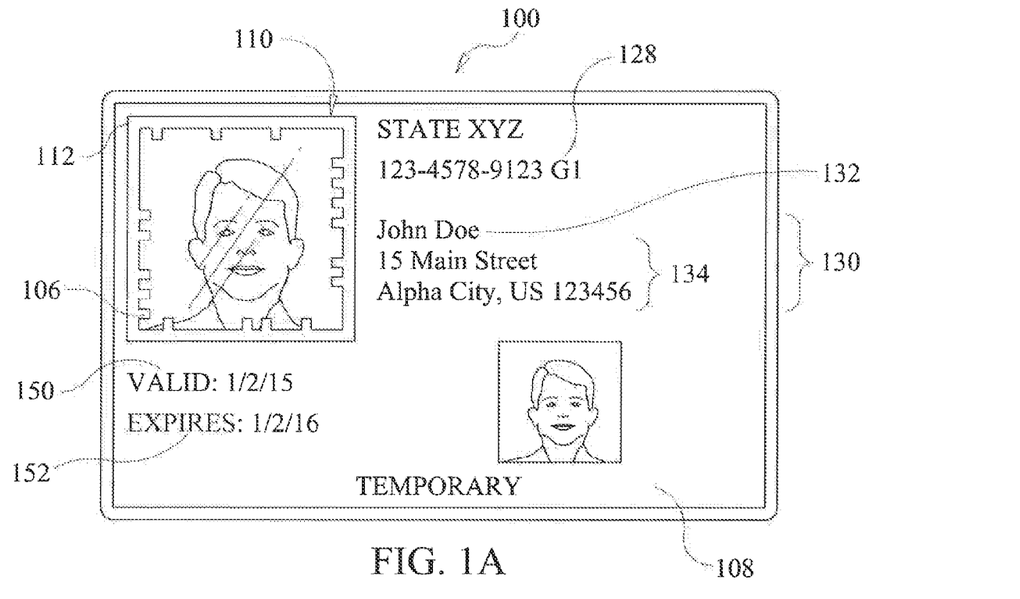
FIGS. 1A-1C are exemplary embodiments of the interactive mail card.
Figure 1B:
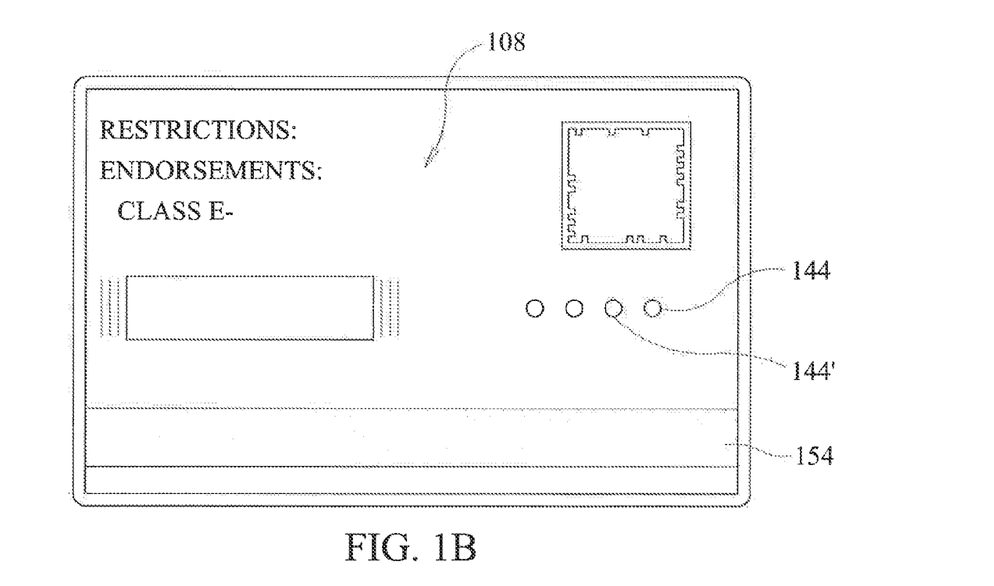
Figure 1C:
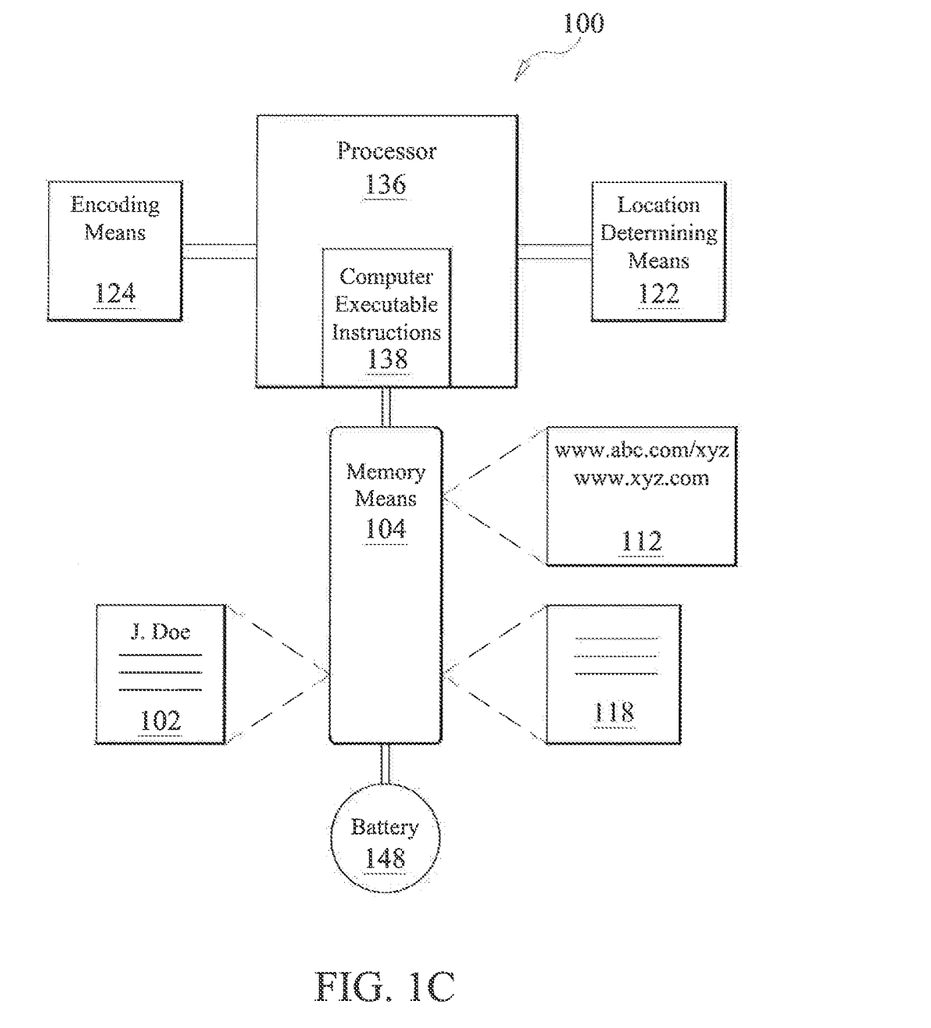
Figure 2:
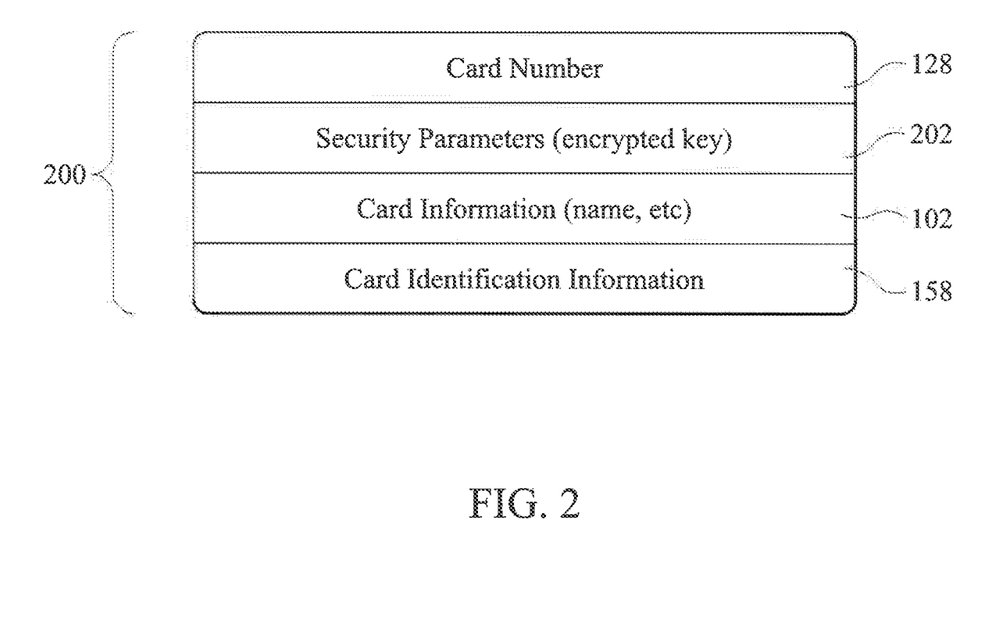
FIG. 2 is an exemplary embodiment of the data structures of the invention.

FIGS. 1A, 1B & 1C are exemplary embodiments of the apparatus 100 of the invention, i.e. an interactive identification card 100. Identification card 100, i.e. an electronic data card, is configured for storing thereon cardholder's identification information 102, data structures 200 (as shown in FIG. 2) and the like. Identification card 100 is selected from the group of electronic devices consisting essentially of programmable smart cards, memory cards, and processor cards, with at least one memory means 104 embedded therein. The identification card 100 includes a coded frame 106 displayed on the card's exterior 108 (either front or back) where the coded frame 106 includes at least one hot corner 110 with at least one or more hyperlinks 112, 112' or icons 114, 114' embedded within the coded frame 106, activated for display when image capturing means 116 scans the coded frame 106 and upon activation, the at least one hyperlink 112 or icon 114 may be engaged for controlling media content 118 and two-way communications between cardholder and one or more government agency 120. Identification card 100 also includes location determining means 122 for determining the location of the identification card 100 with means for encoding 124 the location into an electronic signal 126, which is transmitted to the government agency 120, where the transmitted electronic signal 126 is decoded and the location of the identification card 100 may be determined for responding to communications from the cardholder. Media content 118 may include but is not limited to any one or more of the following: videos, identification verification information, card identification information 102, photographs, questions, and public service announcements, that may be presented in audio, graphics, animation, text, videos or any other format.

Identification card 100 is selected from the group of electronic devices consisting essentially of programmable smart cards, memory cards, and processor cards, with at least one memory means 104 positioned therein. Card identification information 102 as used herein includes any one or more of the following: card number 128, cardholder's contact information 130 (e.g. name 132, address, date of birth, mobile number, cardholder's photograph, authenticating security question(s), and the like), any other information that the issuing government agency may deem significant enough to store on the identification card 100.

In some embodiments, identification card 100 may or may not include a processor 136 positioned within. If the embodiment includes a processor 136, processor 136 may be any type of processor 136, such as, but not limited to, a central processing unit (CPU), a microprocessor, a video processor, a front end processor, a coprocessor, a single-core processor, a multi-core processor, as well as any known processor 136 that is used in the arts to control the various hardware and software components of the identification card 100, e.g. the memory means 104 and the location determining means 122.

As shown in FIG. 1C, in some embodiments, embedded within the processor 136 are computer executable instructions 138, readable and executable by the card's at least one processor 136 where the computer executable instructions 138 are operative to perform the varied system and methods disclosed herein including but not limited to: retrieving the cardholder's identification information 102 when communicating with a card reader 140, for example at the post office for linking mail deposited with the post office 120 with the cardholder for tracking and publishing updates via an application program 142 so that when the coded frame 106 is scanned the cardholder may either receive an updated status for the mail or the mail's status is automatically published with push notification to a mobile device; or retrieving media content 118 pursuant to a scanned coded frame 106 that includes at least one or more hot corners 110, 110', 110" with at least one embedded hyperlink 112 or icon 114 within, and the like. Computer executable instructions 138 may be loaded directly on the card's processor 136, or may be stored in card's memory means 138, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 138 may be any type of computer executable instructions 138, which may be in the form of a computer program, the program being composed in any suitable programming language or source code, such as C++, C, JAVA, JavaScript, HTML, XML, and other programming languages.

In some embodiments, identification card 100 includes at least one memory means 104 as exemplified in FIG. 1C. Such memory means 104 may include a hardware component, e.g. storage hardware, in electrical communication with at least one processor 136. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 104 may comprise of both hardware and software components.

Memory means 104 may include any one or more of the following stored thereon: card identification information 102, and/or any other data structures 200 (as shown in FIG. 2), media content 118, hyperlinks 112, 112', website addresses or Uniform Resource Locators (URLs), and the like. In some embodiments, at least one memory means 104 may be embedded within at least one processor 136 where the information stored therein is encrypted for privacy purposes. In other embodiments, the at least one memory means 104 is adapted with electrical contacts 144, 144' for establishing wired and/or wireless connectivity with external devices, e.g. a computer 146 and/or a card reader 140 via for example the card's at least one microprocessor 136 where the memory means 104 is embedded within.

In some embodiments, identification card 100 may optionally include a battery 148, which serves as a power source for the at least one processor 136 positioned therein. In some embodiment, identification card 100 is adapted with external electrical contacts 144, 144' for establishing wired and/or wireless connectivity to a card reader 140 or a charger, e.g. a docking station, and as such may not include a battery 146. In that event, processor 136 detects when the identification card 100 has been disconnected from an external power source and switches mail card's power source to an internal power source, such as the battery 146.

Referring back to FIG. 1A, identification card 100 may include a card number 128, which acts as a unique identifier for the identification card 100 and/or cardholder. Card number 128 may be assigned by a random number generating program, comprising of numerals, characters, alphanumeric characters or any other unique identifiers that are known and used in the arts. Prior to being issued to the cardholder, the card number 128 may be recorded by the issuing government agency 120 as another means of identifying the cardholder. Identification card 100 may also include other indicia of identification, e.g. the cardholder's name 132. In some embodiments, the cardholder's address 134 may be stored within the mail card's memory means 104. In some embodiments, identification card 100 may include a validation date, i.e. an issue date 150 that may correspond to the date the identification card 100 was issued to a new resident in a community, and an expiration date 152, which corresponds to the date the identification card 100 expires and is no longer valid. In some embodiments, identification card 100 does not include an expiration date 152 as the card may easily be invalidated when the resident moves from that area code.

Identification card 100 also includes a Global Positioning System (GPS) location determining means 122, e.g. communication means with a transponder for transmitting and receiving at least one electronic signal 126 to/from the government agency 120, e.g. post office, police, fire and rescue, etc., notifying the government agency 120 of the card's geographical coordinates at any given time. The location determining means 122 may communicate with either a geosynchronous (GEO) or Low Earth Orbit (LEO) satellite in a network 156. The government agency 120 is therefore able to monitor signals received by a communication system, which is preferably a satellite network system 156, from each identification card 100.

FIG. 2 illustrates, by way of example, collectively the data structures 200 stored within the identification card 100 according to an embodiment of the invention. Data structures 200 are retained within the electronic data card's memory means 104, which preferably provides sufficient processing resources to facilitate communication and maintain adequate security for the card 100. Data structures 200 include but are not limited to: card number 128, security parameters 202, card identification information 102, and the like. Card number 128 may act as a unique identifier allowing the system to uniquely recognize and register each identification card 100 that has been assigned and issued to individual cardholders. Card number 128 may be stored within the identification card's memory means 104 and may also be located on the card's exterior 108. Security parameters 202 may be provided, that may include an encrypted key(s) of military grade, and or security codes, biometric security features, and/or other security mechanisms for maintaining the confidentiality of the data structures 200 stored on the card 100.

Card information 102 may be stored thereon, and it will be understood that access to the card identification information 102 may be provided in a hierarchical form associated with security provisions to protect the confidentiality of the information stored on the identification card 100.

Identification card 100 may include electrical contacts 144, 144' for making electrical contact with a card reader 140. In some embodiments, the identification card 100 includes a magnetic stripe 154 on the back of the identification card 100 encoded with card identification information 158 (i.e. validity of the card, issuing agency 120, and the like). Accordingly, at for example a mailing transaction, when the identification card 100 is swiped through the post office's card reader 140, the application software 152 at the post office's point-of-sale (POS) terminal 160 retrieves the card identification information 102 to consummate the financial transaction and link the mail being mailed to the card holder for tracking purposes. In some embodiments, additional information being verified for the payment transaction includes but is not limited to: validity of the identification card number 128, card's expiration date 152, any stored photographs of the cardholder with the actual person, or with any visible photographic images in the coded frame 106, and the like.

Systems & Methods

Figure 3A:
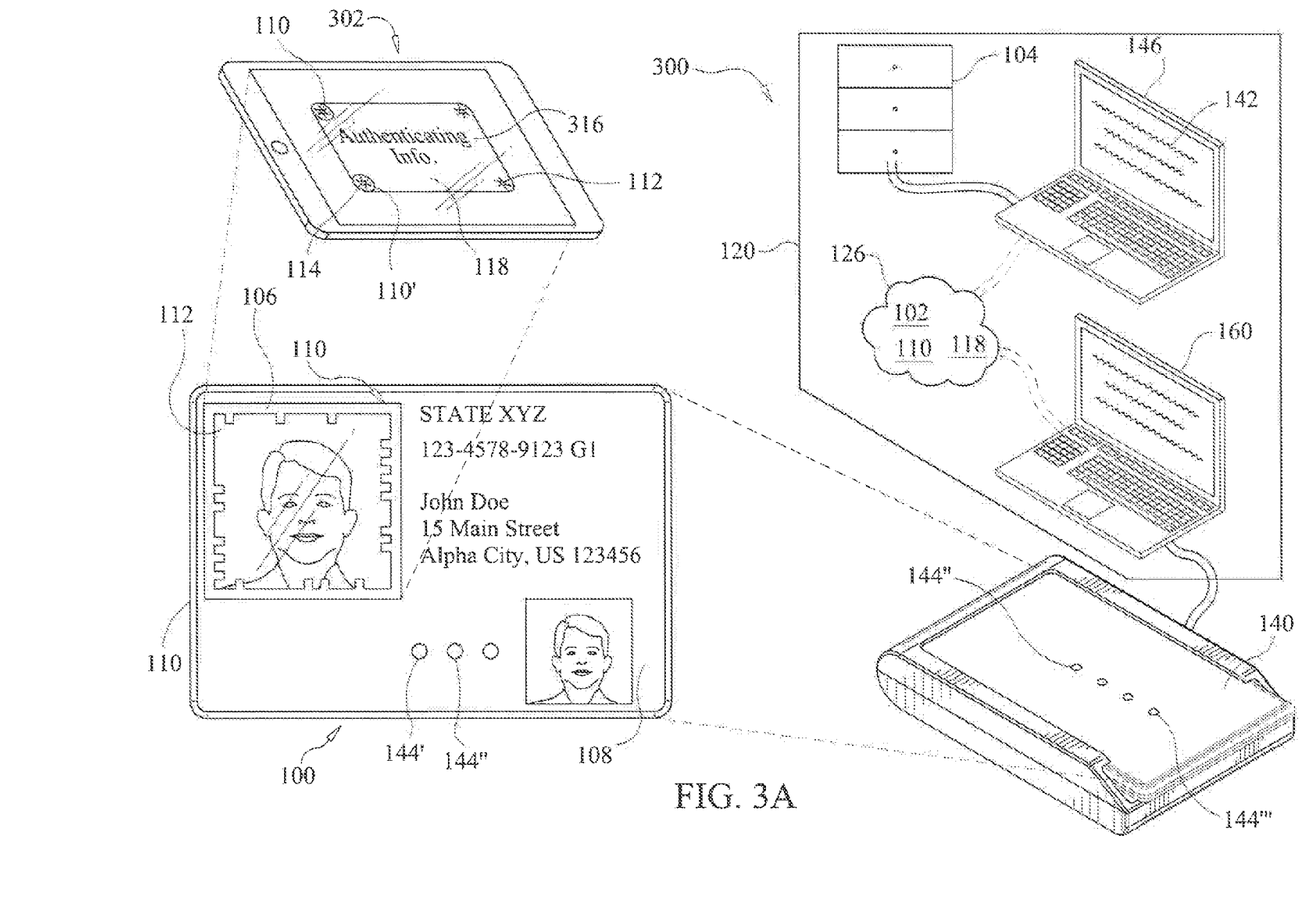
FIGS. 3A-3C are exemplary embodiments of the system and method of the invention.
Figure 3B:
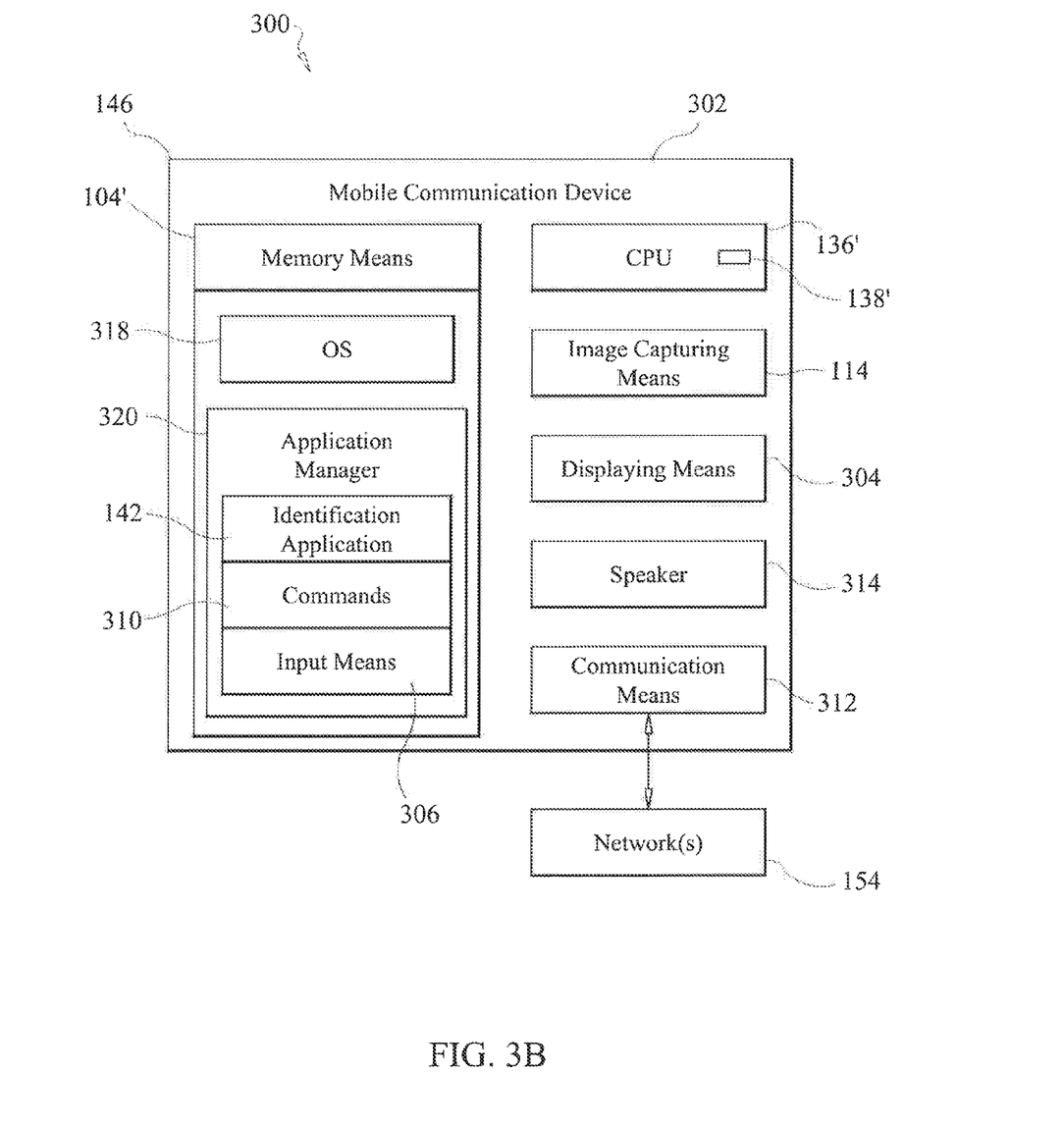
Figure 3C:
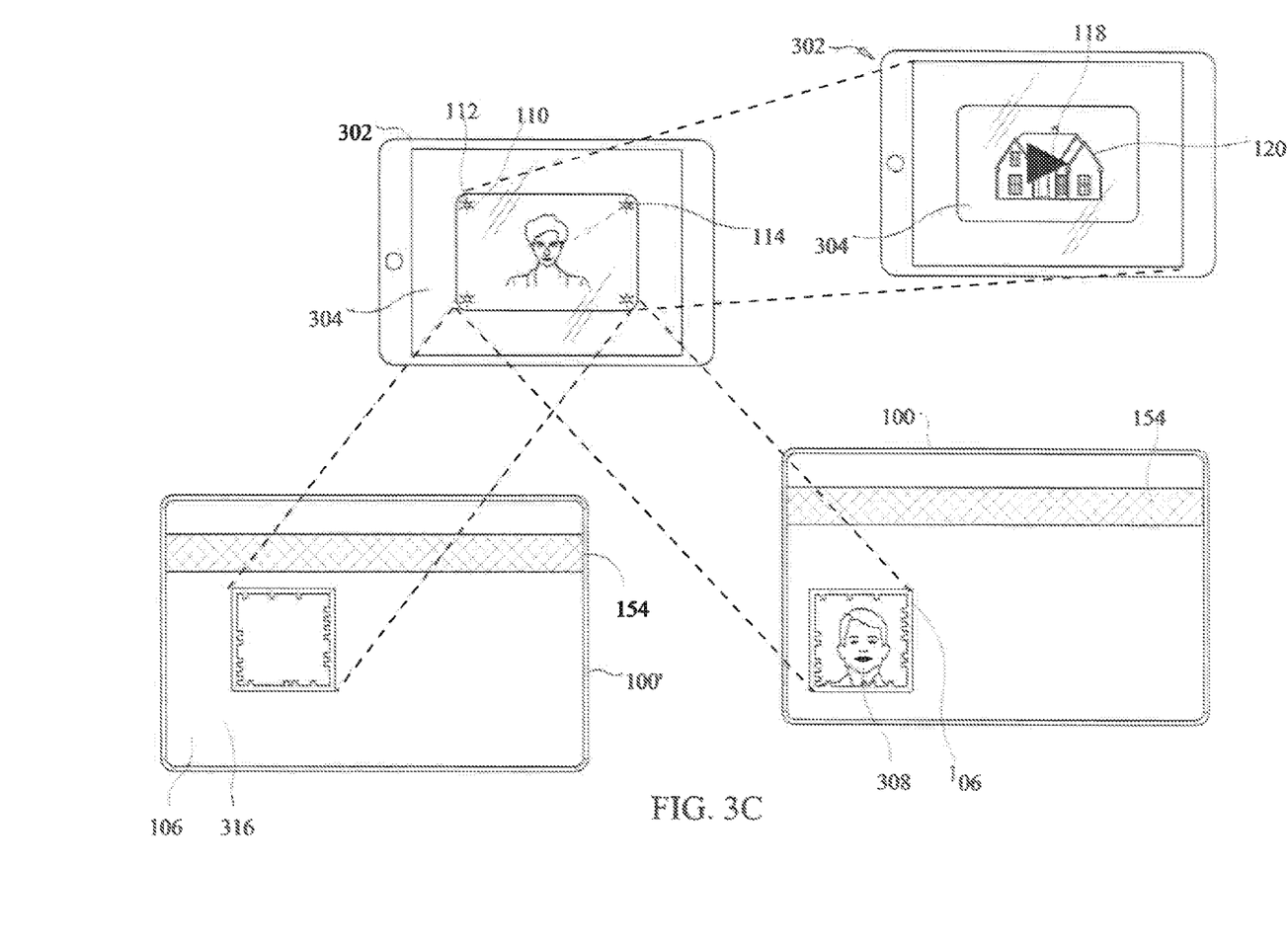

FIGS. 3A-3C are exemplary embodiments of the system 300 of the invention. System 300 comprises of the electronic identification card 100 with identification card information 102 electronically stored thereon. The identification card 102 includes a coded frame 106 displayed on the card's exterior 108 that includes at least one hot corner 110 with at least one hyperlink 112 or icon 114 embedded within the coded frame 106, activated for display when image capturing means 116 scans the coded frame 106 and upon activation, the at least one hyperlink 112 or icon 114 is activated and may be engaged for controlling media content 118 and two-way communications between cardholder and one or more government agency 120. Identification card 100 also includes location determining means 122 for determining the location of the identification card 102 with means for encoding 124 the location into an electronic signal 126, which is transmitted to the government agency 120, where the transmitted electronic signal 126 is decoded and the location of the identification card 102 may be determined for responding to communications from the cardholder. Two-way communications include communications to and from the cardholder and the government agency may include text messages, video transmissions, voice communications and the like.

In some embodiments, the identification card 100 may comprise of an enhanced driver's license similar to driver's license issued by the governing states that are well known and used in the arts, and including the coded frame 106 that may also include an image 308, i.e. a picture of the cardholder within the coded frame 106, such that visual comparison of the image 308 within the coded frame 106 can be scrutinized when the identification card 100 (driver's license) is presented as a means of identification. In some embodiments, the image 304 may be a logo or any other appropriate commercial image. In either embodiment, fraudulent duplication necessitates that not only the image 308 within the coded frame 106 must be accurately duplicated but also the corresponding embedded hyperlinks 112, 112' and/or icons 112, 112', hence the identification card 100 is quite secure.

Systems 300 also comprises of a networked communication device 302 that comprises of: a computer processor 136' that includes computer executable instructions 138', readable and executable by the computer processor 136' and configured for launching the interactive application program 142, programmed for controlling the media content 118; the image capturing means 116; displaying means 304 for displaying the at least one media content 118; and input means 306 for providing input for the two-way communications with the government agency 120.

As shown in FIG. 3B, networked communication device 302 may be any type of electronic computerized communication device configured with means for communicating wirelessly and/or wired with other electronic computer devices, and includes but is not limited to, a computerized scanner, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 156, local area network 156, wide area network 156, such as the Internet 156, or any other type of network device that may communicate over a network 156. Computer 146 as used herein includes but is not limited to a network enabled computer 146, cellular phones like the networked communication device 302 described herein, a laptop or personal digital assistant subject to wired/wireless connectivity, and configured with a computer processor 136.

Networked communication device 302 may include various other hardware components, e.g. memory means 104', one or more communication means 312 and also software components like the mail app 142. The networked communication device's central processor 136' may be programmed to activate the mail app 142, e.g. running in background while the networked communication device 302 is powered on, for viewing media content 118, which may be displayed on the mobile device's displaying means 304 in for example graphics, pictorial, video, audio, animation, text format or any combination thereof.

In some embodiments, the mail app 142 may have its own computer icon 114 or other visual indicator displayed on the networked communication device 302 for launching or providing access to the mail app 142. When consumer selects the respective interactive mail app's icon 114 (e.g. by touching a touchscreen, or selecting it using a pointing device, roller ball, arrow keys, or other controller), upon selection, the communication device's processor 136' launches the mail app 142 and the processor 136' that is also electronically connected to the displaying means 304, controls the displaying means 304 to display the mail app 142 as launched on the at least one mobile device's displaying means 304. Once displayed the mail app 142 is ready for use in scanning the coded frame 106 and/or the image 308 within the coded frame 106 on the identification card 100.

Networked communication device's one or more memory means 104' may be either electrically or mechanically connected to the at least one computer processor 136'. Information stored on the networked communication device's memory means 104' may be retrieved using its processor 136' and may be published via push notification on the mobile device's displaying means 304 or broadcasted over a speaker 314 using the type and configuration of speakers that are well known and used in the arts for cellular phones 304, 304'.

Networked communication device 302 is equipped with communication means 312, either electrically or mechanically connected to the central processor 136'. In the case of electronic connections, the electronic connections may be wired and/or wireless. In some embodiments, communication means 312 may be a wireless communication means 312, which employ short range wireless protocol, such as, but not limited to, a radio frequency transceiver, a radio frequency receiver, and/or a radio frequency transmitter for communicating over the Internet 156 to access for example government agencies, post office, other designated URLs and their corresponding media content 118. It is understood that each coded frame 106 is unique, even if the media content 118 is not.

In embodiments where the wireless communication means 312 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 312 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 312 is operative to transmit or receive electronic communications, i.e. the captured at least one image 308, the coded frame 106, the media content 118, electronic data, audio, videos, text, pictures, graphics and the like via a short range wireless protocol, such as, but not limited to, a radio frequency receiver, a radio frequency transmitter, or a radio frequency transceiver and to communicate and search for the appropriate hyperlinks 112, 112', websites, URLs and the like over the Internet 156.

Networked communication device 302 includes a computer processor 136', disposed within and in electronic communication with the memory means 104'. Computer processor 136' includes computer executable instructions 138' readable and executable by the at least one processor 136'. Computer executable instructions 138' are operative to perform all the necessary functions for the networked communication device 302, including but not limited to: automatically launching the mail app 142, i.e. running a background service while the networked communication device 302 is powered on, and controlling media content 118 corresponding to the coded frame 106 or at least one image 308 within the coded frame 106, which include at least one or more hot corners 110, 110', 110'' with at least one or more embedded hyperlinks 112, 112' or icons 114, 114' within, and the like. Computer executable instructions 138' may be loaded directly on the mobile device's processor 136, or may be stored in mobile device's memory means 104', that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like.

In some embodiments, the system 300 and methods disclosed herein cardholders can assist in policing their neighborhood and providing a quick alert to government agency 120, e.g. suspected mail theft. For instance, if after receiving realtime update of mail being delivered, but instead the mail has not arrived in several days, e.g. a monthly social security checks, bank statement, credit card statement or new credit card, consumer may use the image scanning means 116 to activate the one or more embedded hyperlinks 112, 112' and/or icons 114, 114' to engage in two-way communications with the government agency 120 to provide an alert to, for example the postal service 120. In some embodiments, the two-way communications may be effectuated by linking to the government agency's website and information can be inputted to the website, while in other embodiments, the app 142 receives the input of information and transmits the inputted alert to the government agency 120 by transmitting a text message, or forwarding recording videos and the like using the network communication device's communication means 312.

Cardholder's instance of missing mail may be singular, but there may be others within the same community that have also experienced mail theft or undelivered mail. The postal service 120 may choose to propagate an alert to all cardholders residing within a certain radius so the neighbors can be alerted and vigilant of suspicious activities within the neighborhood. Although, the alert may be sent through an email it could also be sent as a communication (an alert) to the cardholders within for example a predefined radius using the mail card 100, whereby neighboring cardholders can use their image capturing means 116 to hover over the coded icons 114, 114' on each of their mail cards 100, 100' for which the interactive mail card 100 will display the public service announcement of the suspicious activities in the neighborhood.

Other government agencies 120, 120' may also use the card 100 to publish other public service announcements to the cardholders. For example, if criminal activity is suspected to have taken place in the neighborhood, e.g. a child abduction, where the abductee might still be in the neighborhood, the police may issue an alert to be received on the interactive identification card 100 by the cardholder hovering his/her mobile device's camera over the card's coded icon 104, wherein the mail app 142 displays the media content 118, which may comprise of a recorded video 118 providing information and/or precautionary measures to be taken. The system 100 and methods disclosed herein use cloud computing to send the public service announcement 118 to all card holders so that they can receive the information.

In some embodiments, the identification card 100 can also assist in alerting the appropriate authorities of suspicious activities, other than suspected mail fraud. For instance, a cardholder may notice a suspicious individual or package left unattended in a public place, e.g. road, building, street, banks, etc. and would like to alert the authorities of such conduct. By using the interactive coded icon 114 at anytime, anywhere, consumer can use the identification app 142 to select the appropriate interactive icon 114 for reporting incidents, suspicious packages or activities. Since the identification card 100 includes GPS location determining means 122, the government agencies 120, 120' can use the card's GPS location determining means 122 to determine the location of the cardholder and respond to the communications from the cardholder. The identification card 100 is registered, which serves as a deterrent for false reports of fake emergencies as the government agencies 120, 120' have the name and contact information for the cardholder who is reporting the suspicious activity using his/her identification card 100. It is also understood that the system 100 and methods disclosed herein may be implemented using a driver license.

Mail app 142, also comprises of computer executable instructions 138" readable and executable by the at least one processor 136', and is configured for performing any all the necessary functions for the system 100 and methods of the invention, which may include any one or more of the following: controlling media content 118 corresponding to the coded frame 106 and/or the at least one image 308 within the coded frame 106, where the coded frame 106 includes at least one or more hot corners 110, 110', 110" with at least one embedded hyperlink 112 or icon 114 within, responsive to the control command 310 associated with the hyperlink 112 or icon 114 in the hot corner 118; activating the at least one or more hot corners 110, 110', 110" when the at least one image 308 within the coded frame 106 is scanned as shown in FIG. 3C, and providing two-way communications with the government agency 120. Mail app 142 is also configured for playing the at least one media content 118 for the coded frame 106 or the captured at least one image 308 within the coded frame 106 pursuant to a control command 310 associated with the at least one embedded icon 114 or hyperlink 112; receiving at least one control command 310 for activating the at least one media content 118 within the coded frame 114 with full functionality for review and control when the media content 118 is for instance displayed. Control command 310 include but are not limited to any one or more of the following: play, stop, fast-forward, rewind, pause, maximize viewing, minimize, end and cancel; retrieving directions related to the media content 118 for the captured at least one image 308; retrieving the at least one media content 118, e.g. a security questions, card information 102, that it accomplishes by linking to a website using a designated URL, and the like. The at least one control command 310' associated with the at least one embedded icon 114 includes any one of the following: display media content 118, play audio for media content 118, link to an electronic address, provide two-way communication with the government agency 120 and the like.

In some embodiments, as shown in FIG. 3C, where the identification card 100 includes an image 308, the mail app 142 is configured for controlling the media content 118 corresponding to the at least one image 308 within the coded frame 106 by overlaying the image 308 with the at least one embedded icon 114, which has an associated control command 310. In an alternate embodiment, as shown in FIG. 3C, if the identification card 100' does not include an image 308 within the coded frame 106, the mail app 142 is configured for controlling the media content 118 corresponding to the coded frame 106 by overlaying the designated area 316 with the at least one embedded icon 114, which has an associated control command 310.

Networked communication device 302 may include any kind of displaying means 304, such as, but not limited to: a liquid crystal display ("LCD") screen, a light emitting diode ("LED") display, touchpad or touch screen display, and/or any other means known in the arts for emitting a visually perceptible output. Mobile device's processor 136' is in electronic communication with its displaying means 304. In other embodiments, displaying means 304 is wirelessly connected to processor 136'. Displaying means 304 may include control means, such as, but not limited to, a touch screen, a stylus, and the like that may be used to also control or input communications, e.g. send text messages, forwarded recorded videos, audio and the like to the government agency 120 or interact with the media content 118, e.g. identification verification questions. In some embodiments, displaying means 304 may be electronically connected to a networked communication device 302 according to the hardware and software protocols that are known and used in the arts. Computer central processor 136 controls the mobile device's displaying means 304, which is configured for displaying the media content 118 and the like.

Networked communication device 302 also includes software components that may be stored in the memory means 104'. Memory means 104' may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by networked communication device 302. Networked communication device 302 may also contain an input element for inputting data and an output element for displaying data.

Also stored on the memory means 104' may be an operating system 318, application manager 320, and the mail app 142. Mail app 142 may be an independent component or may be incorporated into the operating system 318. Mail app 142 is a computer-executable component, readable and executable by the computer processor 136', wherein the mail app 142 links to the Internet 156 to retrieve at least one or more media content 118 to be displayed on the mobile device's displaying means 304. The media content 118 may be in any format, e.g. audio, video, pictorial, text message, graphics, and as such is published or also broadcasted in any format to the networked communication device 302.

Application manager 320 comprises of computer-executable components that operate in the networked communication device 302 and may be implemented in a variety of ways. In one embodiment of the invention, application manager 320 may use one or more computer-executable components for interacting with mail app 142. In another embodiment, mail app 142 is incorporated in application manager 320 to receive information from the input element, to communicate with, and/or to control the operations of mail app 142.

Mail app 142 may comprise in part of a browser, such as for use on the networked communication device 302, or a similar browsing device. Mail app 142 may be any type of software application, such as a standalone application designed to run on a mobile platform, such as a mobile device running an operating system 318, such as iOS™, Android™, Windows Mobile™, Blackberry™, and the like. Mail app 142 may be operative for an iPhone, any other "smart phone," mobile device, cellular phone, PDA, GPS or any other networked communication device 302 capable of handling electronic transactions dealing with dynamic content, object, application, or software. In some embodiments, the mail app 142 may be designed to run on a social network platform, such as FACEBOOK® or JUSTSYNC®, TWITTER® and the like. In some embodiments, mail app 142 may reside on a server computer 146 and may be downloadable from the server computer 146, the server computer's electronic database 104" or otherwise reside in the networked communication device's local memory means 104'. For example, in one embodiment, the mail app 142 may be on a networked communication device 302 (such as an iPhone, Blackberry, or other "smart phone") and the full-sized software program may be on a computer 146, where communications may occur over a network 156 or directly, either wired or wirelessly.

Referring back to FIGS. 3A & 3C, the networked communication device 302 may be used to scan the coded frame 106 and/or any image 308 within the coded frame 106 on the identification card 100 for verification of the consumer's identity. For example, consumer may use image capturing means 116, e.g. a mobile device's camera, to scan or hover over the coded frame 106 and/or any image 308 activating the undisplayed, embedded at least one hyperlink 112 or icon 114. Once the coded frame 106 and/or the image 308 is scanned the at least one or more hot corners 110, 110', 110" with the at least one hyperlink 112 or icon 114 are activated and viewable to be engaged for controlling interactive media content 118 pursuant to a control command 310 associated with the at least one icon 114 or hyperlink 112 in the at least one hot corner 108. In some embodiments, the control commands 310, 310' also become viewable and are displayed when the hot corners 110, 110', 110" or icons 112, 112' are activated. The activated at least one or more hot corners 110, 110', 110" or icons 112, 112' may pulsate, blink or displayed in a color contrast or animated to alert the consumer of the option to interact with the hot corners 110, 110', 110" and/or the icons 112, 112' by exploring one or more of the interactive control commands 310, 310' associated with the icons 112, 112'.

The icons 114, 114' or hyperlinks 112, 112' may be engaged on the networked communication device's displaying means 304 by overlaying the image 308 or designated display area 316 within the coded frame 106 with at least one icon 114, which causes the mail app 142 to retrieve the media content 118 for display. The interactive media content 118 may be stored on the mail card's memory means 104, the computer server's 146' or linked to a website or other URL, where the media content 118 may remain dynamic. Media content 118 includes cardholder's information 122 such that if the identification card 100 is a fake, since the cardholder's information 122 that may be stored thereon is coded and only viewable when scanned by image capturing means 116. Exemplary cardholder's information 122 may include but is not limited to cardholder's photograph 306, authenticating security questions, that may comprise of a randomly generated sequence based on the cardholder's known information, whereby the questions being posed are dynamic and may differ every time.

In some embodiments, once the networked communication device's image capturing means 116 hovers over the coded frame 106, it causes the app 142 to automatically display the media content 118, that may include for example one or more stored videos, etc. that are associated with the coded frame 106. In some embodiments of the invention, the app 142 includes virtual radio buttons 322, 322' that may allow the consumer to further manipulate the image, e.g. play, rewind, fast forward, scroll text, or stop the video 118 being played. As such, the app 142 makes a determination of whether a corresponding media content 118 exists; conducts at least one electronic computerized search for the corresponding media content 118 to the extent that the media content 118 exists; retrieves the media content 118 for the coded frame 106 and/or the image 308; and display the media content 118 on the mobile device's displaying means 304.

As seen in FIG. 3A, system 300 further comprises of a card reader 140 connected to a computer 146, wherein the card reader 140 is configured for reading the identification card 100 for verifying the cardholder's identity. Card reader 140 describes an electronic device for scanning and reading electronic data cards, e.g. the identification card 100, via the exemplary magnetic stripe 154, to obtain electronic data stored thereon as are well known and used in the arts. Card reader 140 is connected to a computer 146 either wirelessly or wired, wherein card reader 140 is configured for scanning and reading any one or more of the following: the identification card number 128, the card identification information 102, and/or any other component of the data structures 200 stored thereon. Card reader 140 is further configured for reading or writing to the identification card 100. Card reader 140 as exemplified herein may be adapted with electrical contacts 144", 144''' for establishing wired and/or wireless connectivity to the identification card 100, and/or the computer 146 and transmits that mail card number 128 to the computer 146, where the identification card 100 is authenticated as a validly issued card. In some embodiments, a wireless connection may be established, wherein communication access is established with the computer 146 or the identification card 100 in response to proximity or manual activation of the card reader 140. Card reader 140 may also be integrated within a computer 146 (e.g. with a slot for wired card connectivity), an external device (e.g., USB connection to a small housing), or be integrated into other devices.

In one embodiment, for the mailing of a package, the card reader 140 may be used to read the identification card 100 as swiped, reading for example the cardholder's name 132 such that the mail can be linked to the cardholder's card 100 for tracking purposes. Cardholder may use a network enabled communication device 302, e.g. a cell phone, with image capturing means 116 to access and track the delivery status of the package. Cardholder may scan at his/her leisure the coded frame 106 (or the coded frame 106 with the image 308) on his/her identification card 100 to determine the mail delivery status of the package, e.g. sorted, at sorting facility, on the delivery truck, attempted delivery, delivered, returned to post office, and the like. Upon scanning the coded frame 106, the hot corners 110, 110' with the embedded hyperlinks 112, 112' or icons 114, 114' are activated and are now visible for engagement of the media content 118 that is automatically retrieved by the app 142. In some instances, the government agency 120 may require completion of an identification validation process by posing security question(s) for the cardholder to answer. In that manner, cardholder may use another individuals communication device 302 but not automatically gain access to the mail delivery status for someone's else's mail. It is understood that the security question(s) would involve answers known only by the cardholder and/or a chosen few, but not a stranger. Once the cardholder answers the question, the mail app 142 communicates the response to the networked communication device's processor 136 that controls the communication means for transmitting the response to the security questions instantly in realtime, so that the response can be immediately confirmed. If the answer is correct, access to the mail delivery status will be allowed and in some instances if incorrect, the cardholder may have another opportunity to provide a correct answer. According to the system and methods of the invention, alternate questions posed may differ from the previous question(s) asked. If the cardholder still answers incorrectly, the identification card 100 may be canceled or suspended immediately as a potential fraudulent card inquiry.

Methods

Figure 4:
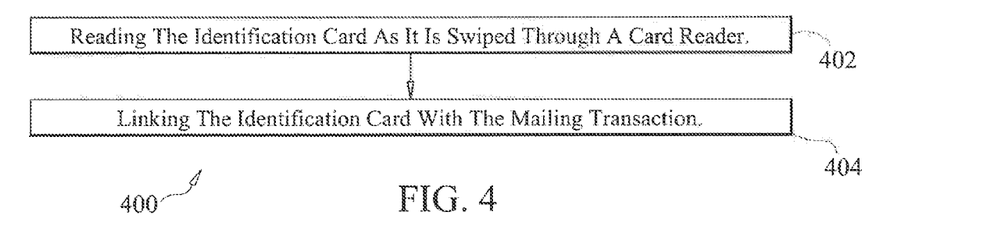
FIG. 4 is an exemplary method according to one embodiment of the invention.

FIG. 4 shows an example of an exemplary method 400 according to one embodiment. During a mailing transaction, the post office 120 will need to know the cardholder's identity so that the mailed item can be linked to the identification card 100 for tracking purposes. Method 400 comprises of reading the identification card 100 as it is swiped through a card reader 140 where for instance the cardholder's name 128 is read (step 402). It is understood that the identification card 100 may be swiped at the beginning, during, or at the end of the mailing transaction, e.g. the card 100 is swiped before zip code and rates are applied, immediately prior to, or after payment of the mail, or in some embodiments, the identification card 100 is a payment card with payment information stored thereon and as such is used to pay for the mailing transaction. Method 400 further comprises linking the identification card 100 with the mailing transaction (step 404). With the linking of the identification card 100 to the mailing transaction check the status of the mail at anytime without having to access his/her email.

Figure 5:
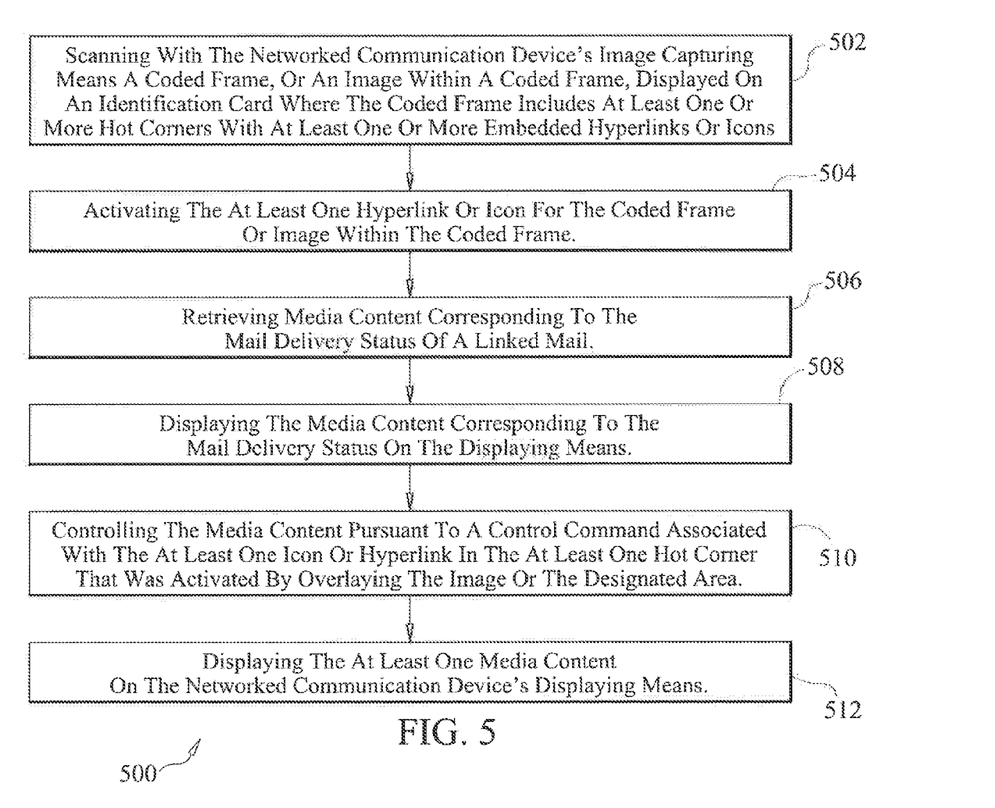
FIG. 5 is an exemplary method according to one embodiment of the invention.

FIG. 5 shows an example of an exemplary method 500 according to one embodiment. Method 500 comprises of scanning with the networked communication device's image capturing means 116 a coded frame 106, or an image 308 within a coded frame 106, displayed on an identification card 100 where the coded frame 106 includes at least one or more hot corners 110, 110', 110" with at least one or more embedded hyperlinks 112, 112' or icons 114, 114' embedded within (step 502).

Method 500 further comprises activating the at least one hyperlink 112 or icon 114 for the coded frame 106 or image 308 within the coded frame 106 (step 504), where once it is activated the at least one or more embedded hyperlinks 112, 112' or icons 114, 114' become visible and are displayed on the displaying means 304. Method 500 further comprises retrieving media content 118 corresponding to the mail delivery status of a linked mail (step 506). Mail app 142 retrieves the media content 118 from any one or more of the following sources: electronic database 326, the mail card's memory means 104, hyperlinking to a Uniform Resource Locator, other website addresses and the like. Method 500 further comprises displaying the media content 118 corresponding to the mail delivery status on the displaying means 304 (step 508), where the consumer may engage the at least one hyperlink 112 or icon 114 for further interaction by overlaying a display area 324 if the coded frame 106 does not include an image 308 with the at least one hyperlink 112 or icon 114 or overlaying the image 308 within the coded frame 106 with the at least one hyperlink 112 or icon 114. By overlaying the display area 324 or the image 308 with the at least one icon 114, the icon and the hyperlink 112 are activated and may pulsate, blink or displayed in a color contrast or animated format to alert the consumer of the option to interact further with the hot corners 110, 110', 110" and/or the icons 112, 112' by exploring one or more of the interactive control commands 130, 130' associated with the icons 112, 112' or hyperlinks 112, 112'.

In some embodiments, method 500 comprises controlling the media content 118 pursuant to a control command 310 associated with the at least one icon 114 or hyperlink 112 in the at least one hot corner 108 (step 510) that was activated by overlaying the image 308 or the designated area 316, which may include displaying the at least one media content 118 on the networked communication device's displaying means 304 (step 512).

Once the media content 118 is displayed on the networked communication device's displaying means 304, the cardholder's identity may be authenticated based on the media content 118 as displayed on the networked communication device. For instance the media content 118 may include security questions or a photograph that may be used to verify the cardholder's identity. The media content 118 may be displayed within the coded frame 106 or in some embodiments is not confined to the coded frame 106 as it is displayed on the displaying means 304. In either event, the media content 118 may be controlled with full functionality for review and control using the control command 310 associated with the at least one embedded icon 114 or hyperlink 112 that has been activated and includes any one of the following: display media content 118, display promotions for featured product, display product details, locate stores, and generate directions. Control command 310 for displaying the at least one media content include but are not limited to any one or more of the following: play, stop, fast-forward, scroll text, rewind, pause, maximize viewing, minimize, end and cancel.

Figure 6:
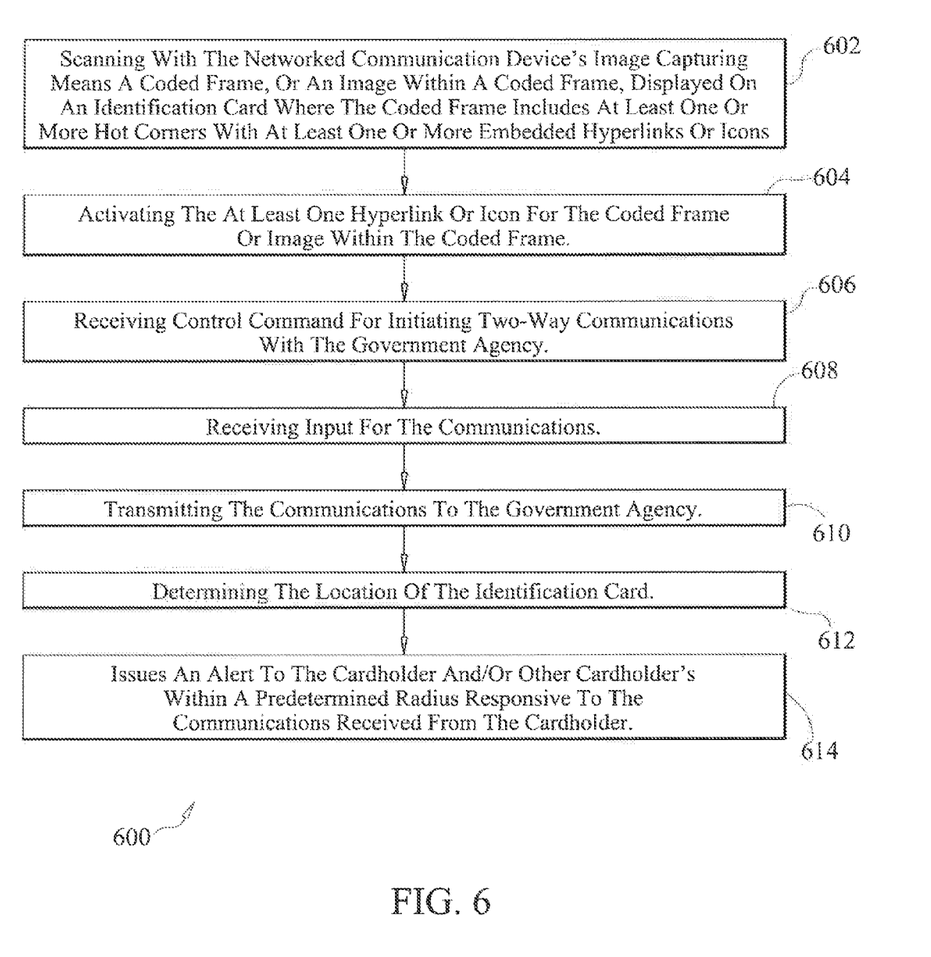
FIG. 6 is an exemplary method according to one embodiment of the invention.

FIG. 6 shows an example of an exemplary method 600 according to one embodiment. Method 600 comprises of scanning with the networked communication device's image capturing means 116 a coded frame 106, or an image 308 within a coded frame 106, displayed on an identification card 100 where the coded frame 106 includes at least one or more hot corners 110, 110', 110" with at least one or more embedded hyperlinks 112, 112' or icons 114, 114' embedded within (step 602).

Method 600 further comprises activating the at least one hyperlink 112 or icon 114 for the coded frame 106 or image 308 within the coded frame 106 (step 604), where once it is activated the at least one or more embedded hyperlinks 112, 112' or icons 114, 114' become visible and are displayed on the displaying means 304. Method 600 further comprises the mail app 142 receiving control command for initiating two-way communications with the government agency 120 (step 606) and receiving input for the communications (e.g. voice, text, audio and the like) (step 608) and communicating with the processor to initiate communications using the communication means 312 for transmitting the communications to the government agency 120 (step 610).

In some embodiment, the government authorities 120 use the card's location determining means 122 of the identification card 100 for determining the location of the card 100 (step 612) and by extension the cardholder for any additional follow up, responsive to the communications received form the cardholder. In some embodiments, the government agency 120 issues an alert to the cardholder and/or other cardholder's within the nearby vicinity, e.g. a predetermined radius responsive to the communications received from the cardholder (step 614).

Hardware and Operating Environment

This section provides an overview of example hardware and the operating environments in conjunction with which embodiments of the inventive subject matter can be implemented.

A software program may be launched from a computer readable medium in computer-based systems 100-300 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
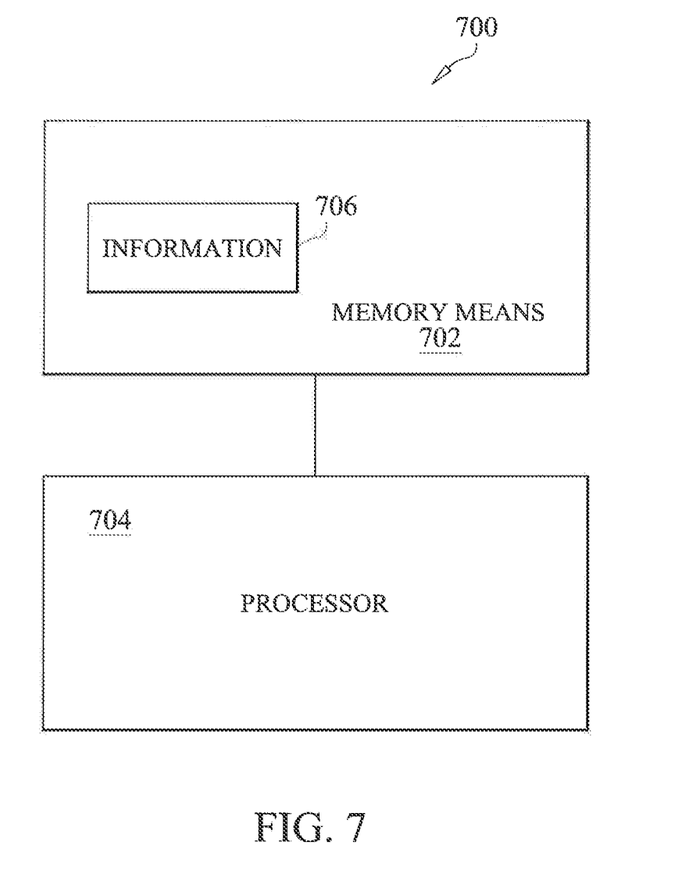
FIG. 7 is a block diagram representing an apparatus according to various embodiments.

FIG. 7 is a block diagram representing an apparatus 700 according to various embodiments. Such embodiments may comprise a computer, a memory system, a magnetic or optical disk, some other storage device, or any type of electronic device or system. The apparatus 700 may include one or more processor(s) 702 coupled to a machine-accessible medium such as a memory 704 (e.g., a memory including electrical, optical, or electromagnetic elements). The medium may contain associated information 706 (e.g., computer program instructions, data, or both) which, when accessed, results in a machine (e.g., the processor(s) 704) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus comprising of:
    an identification card with identification information electronically stored thereon where the identification card includes a coded frame displayed on its exterior that includes at least one hot corner with at least one hyperlink or icon embedded within the coded frame, activated for display when image capturing means scans the coded frame and upon activation, the at least one hyperlink or icon may be engaged for controlling media content and two-way communications between cardholder and one or more government agency; and
    location determining means for determining the location of the identification card with means for encoding the location into an electronic signal, which is transmitted to the government agency, where the transmitted electronic signal is decoded and the location of the identification card may be determined for responding to communications from the cardholder.

2. The apparatus of claim 1, further comprising an image displayed within the coded frame.

3. The apparatus of claim 2, wherein the at least one media content may be displayed in any one or more of the following formats: graphics, animation, pictorial, video, audio, or text.

4. The apparatus of claim 1, wherein the at least one media content includes any one or more of the following: mail information, public service announcement.

5. The apparatus of claim 1, wherein the customs verification application is further configured for displaying the at least one media content within the coded frame with full functionality for review and control using the control commands.

6. The apparatus of claim 1, wherein at least one control command associated with the at least one at least one hyperlink or icon includes any one of the following: display media content, link to government agency's website, or link to a designated website.

7. A system comprising:
    an identification card with identification information electronically stored thereon where the identification card includes a coded frame displayed on its exterior that includes at least one hot corner with at least one hyperlink or icon embedded within the coded frame, activated for display when image capturing means scans the coded frame and upon activation, the at least one hyperlink or icon may be engaged for controlling media content and two-way communications between cardholder and one or more government agency, and including location determining means for determining the location of the identification card with means for encoding the location into an electronic signal, which is transmitted to the government agency, where the transmitted electronic signal is decoded and the location of the identification card may be determined for responding to communications from the cardholder; and
    a networked communication device that comprises:
        a computer processor that includes computer executable instructions executable by the computer processor and configured for launching an interactive verification application program, programmed for controlling the media content;
        the image capturing means;
        displaying means for displaying the at least one media content; and
        input means for providing input for the two-way communications with the government agency.

8. The system of claim 7, further comprising a card reader for reading the identification information from the identification card for providing mail status updates to the cardholder.

9. The system of claim 7, wherein the interactive verification application is further configured for publishing mail status updates in realtime.

10. The system of claim 7, wherein the interactive verification application is further configured for facilitating communications of an alert to the government agency.

11. A computer-implemented method for using an interactive identification card comprising executing on a processor the steps of:
    scanning with image capturing means a coded frame or a coded image within a coded frame displayed on the identification card with identification information electronically stored thereon where the coded frame includes at least one hot corner with at least one hyperlink or icon embedded within;
    activating for display the activated at least one hyperlink or icon for the coded frame or a coded image within the coded frame;
    receiving control command for initiating two-way communications with the government agency;
    receiving at least one control command for activating at least one media content within the coded frame;
    receiving input for the communications; and
    transmitting the communications to the government agency.

12. The method of claim 11, further comprising determining the location of the identification card.

13. The method of claim 11, further comprising displaying the at least one media content on a networked communication device's displaying means.

14. The method of claim 11, wherein the at least one control command for activating the at least one media content includes any one or more of the following: play, stop, fast-forward, rewind, pause, maximize viewing, minimize, end and cancel.

15. The method of claim 11, further comprising retrieving media content for any one or more of the following: electronic database, the mail card's memory means, hyperlinking to a Uniform Resource Locator.

16. A system comprising:
an identification card with identification information electronically stored thereon where the identification card includes a coded frame displayed on its exterior that includes at least one hot corner with at least one hyperlink or icon embedded within the coded frame, activated for display when image capturing means scans the coded frame and upon activation, the at least one hyperlink or icon may be engaged for controlling media content and two-way communications between cardholder and one or more government agency, and including location determining means for determining the location of the identification card with means for encoding the location into an electronic signal, which is transmitted to the government agency, where the transmitted electronic signal is decoded and the location of the identification card may be determined for responding to communications from the cardholder; and
a networked communication device that comprises:
a computer processor that includes computer executable instructions executable by the computer processor and configured for launching an interactive verification application program, wherein the interactive verification application is configured for publicizing a public service announcement to a plurality of other card holders within a certain radius and wherein the interactive verification application program is programmed for controlling the media content;
the image capturing means;
displaying means for displaying the at least one media content; and
input means for providing input for the two-way communications with the government agency.

17. A computer-implemented method for using an interactive identification card comprising executing on a processor the steps of:
scanning with image capturing means a coded frame or a coded image within a coded frame displayed on the identification card with identification information electronically stored thereon where the coded frame includes at least one hot corner with at least one hyperlink or icon embedded within;
activating for display the activated at least one hyperlink or icon for the coded frame or a coded image within the coded frame;
receiving control command for initiating two-way communications with the government agency;
receiving input for the communications;
transmitting the communications to the government agency;
issuing a communication to the cardholder responsive to the communications received from the cardholder; and
issuing a communication to other cardholders within a predetermined radius responsive to the communications received from the cardholder.

* * * * *